Feb. 24, 1970    C. J. SMITH ET AL    3,497,209
CONTINUOUS STACKING APPARATUS FOR LIGHT GAUGE SHEETS
Filed March 21, 1968    5 Sheets-Sheet 1
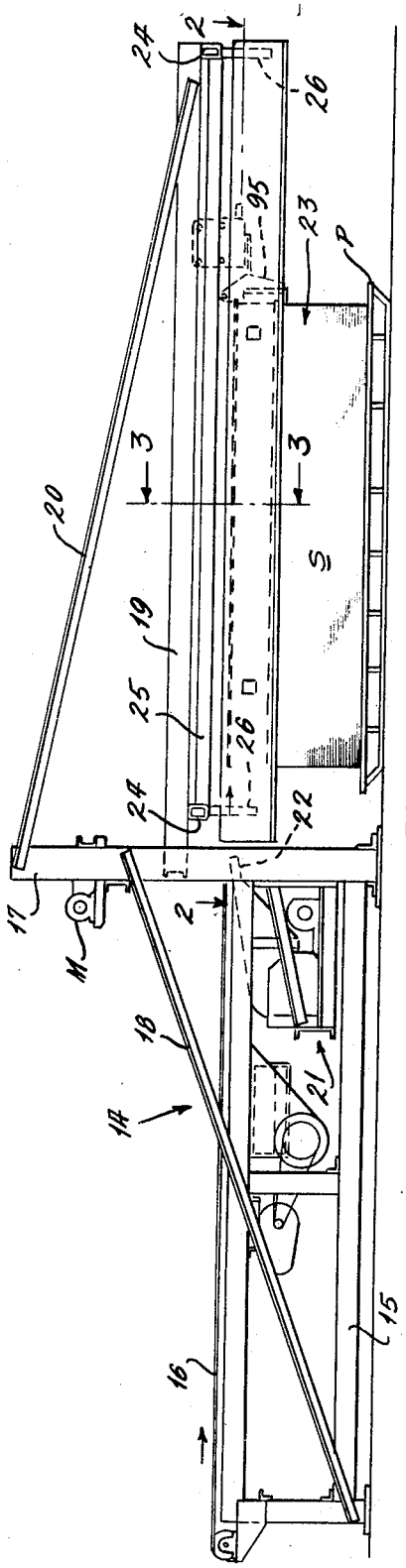
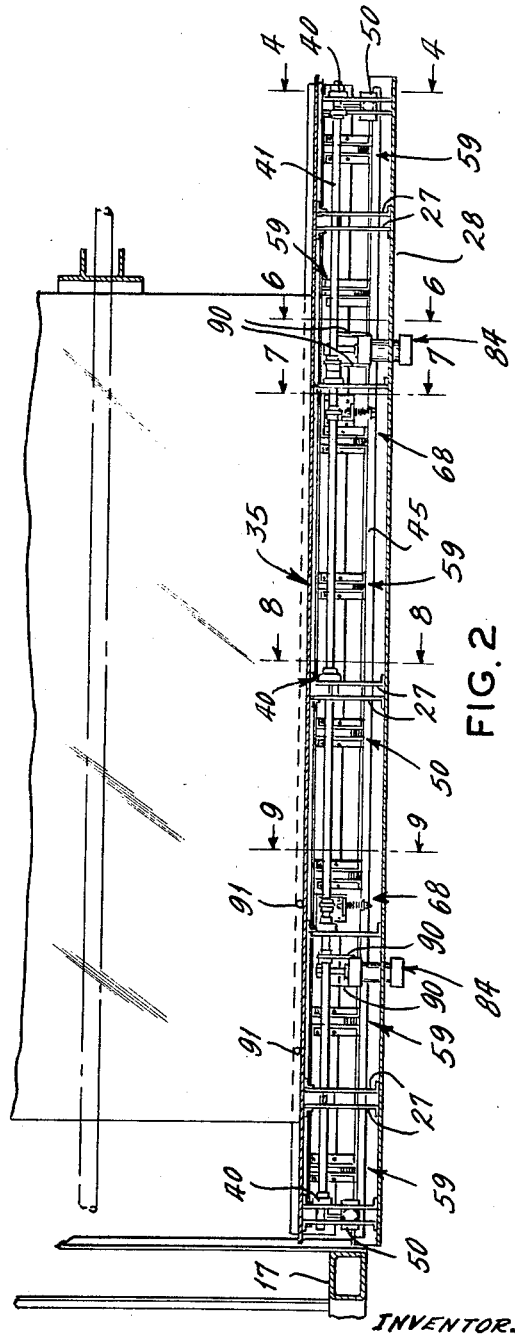
INVENTORS:
CULLEN J. SMITH
CHARLES W. WERNTZ
BY Gravely, Lieder & Woodruff
ATTORNEYS.

Feb. 24, 1970　　　C. J. SMITH ET AL　　　3,497,209
CONTINUOUS STACKING APPARATUS FOR LIGHT GAUGE SHEETS
Filed March 21, 1968　　　　　　　　　　　　　5 Sheets-Sheet 2

INVENTOR:
CULLEN J. SMITH
CHARLES W. WERNTZ
BY Gravely, Lieder & Woodruff
ATTORNEYS INVENTORS:
CULLEN J. SMITH
CHARLES W. WERNTZ
BY Gravely Lieder & Woodruff
ATTORNEYS.

INVENTOR:
CULLEN J. SMITH
CHARLES W. WERNTZ
BY Gravely Leder & Woodruff
ATTORNEYS.

INVENTOR:
CULLEN J. SMITH
CHARLES W. WERNTZ
BY Gravely, Lieder & Woodruff
ATTORNEYS.

United States Patent Office 3,497,209
Patented Feb. 24, 1970

3,497,209
CONTINUOUS STACKING APPARATUS FOR LIGHT GAUGE SHEETS
Cullen J. Smith, St. Louis, and Charles W. Werntz, Ferguson, Mo., assignors, by mesne assignments, to L. W. Nash Company, East Palestine, Ohio, a corporation of Delaware
Filed Mar. 21, 1968, Ser. No. 714,887
Int. Cl. B65h 31/26
U.S. Cl. 271—86   10 Claims

ABSTRACT OF THE DISCLOSURE

Apparatus for continuously stacking sheets in which finger plates are projected into the path of air cushioned falling sheets to engage the margins of a sheet and hold it to form the bottom of a continuing stack while the stack of accumulated sheets is removed and an empty skid or pallet is put into position. The finger plates engage and support the sheets until the empty pallet is in position ready to receive the collection which has accumulated during the switching from a loaded pallet to an empty pallet. The finger plates cooperate with clamping means to firmly grip at least one sheet so as to form a temporary support for other sheets, whereby the supply of sheets does not have to be interrupted while the switching of pallets takes place.

---

This invention relates to improvements in sheet stacking apparatus and is particularly concerned with means to allow continuous feeding of sheets into the apparatus.

Heretofore, the stacking of sheet material in high capacity apparatus has usually required two-station equipment so that one station could be used to collect a stack of sheets while the second station was being cleared of a stack and an empty skid or pallet put into position. The back and forth switching of such apparatus consumes time and requires added equipment which is expensive. Also, two-station stacking equipment requires plant floor space which adds to the cost. Where two-station equipment cannot be accommodated due to cost limitations and lack of floor area, single station apparatus must be used and this requires periodic stopping of the operation during the switch from a full to an empty skid or pallet.

The present invention has as an important object the provision of means for permitting continuous operation of a single station stacker so that more efficient utilization of apparatus and less floor area can be realized.

It is also an important object of this invention to provide continuous stacking means that will avoid damage to the sheets being stacked.

Another object of this invention is to provide means in sheet stacker apparatus that will utilize a sheet as a temporary support for other sheets during the switching of pallets.

Other objects of this invention will be hereinafter set forth in connection with a presently preferred embodiment which will be described in connection with the accompanying drawings.

The presently preferred embodiment includes sheet gripping means operatively carried by the usual side guides of stacker apparatus so as to engage the margin of a sheet and support other sheets deposited thereon. The gripping means is arranged to adjust its position to conform with the line of thrust (or bowing) of the sheets whereby to avoid bending of the sheet margins. The embodiment to be described has a range of operating selectivity for handling reject sheet material and sheets that may be sufficiently stiff to be self-supporting and not require marginal gripping. It is intended, therefore, to include the novel components and sub-assemblies to be hereinafter described and claimed.

Figure 6:
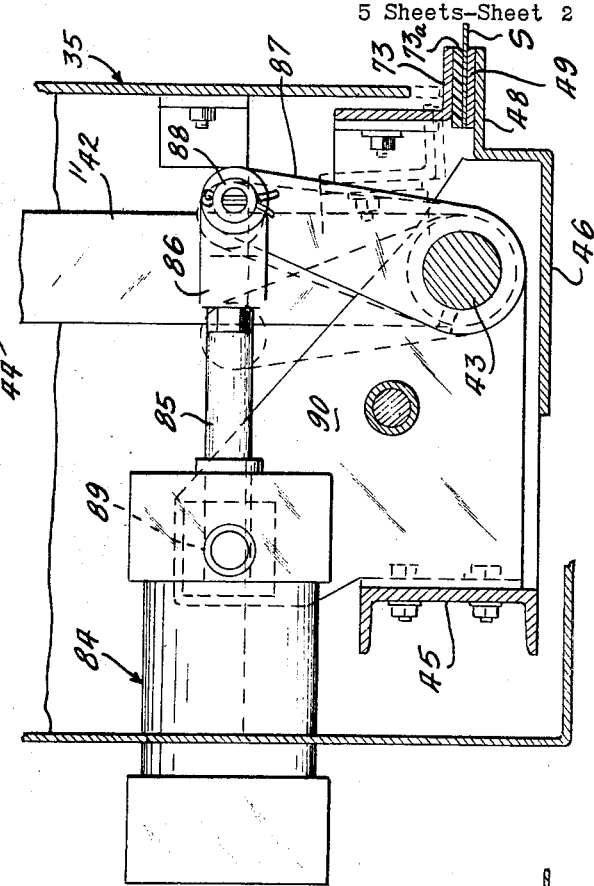
Figure 3:
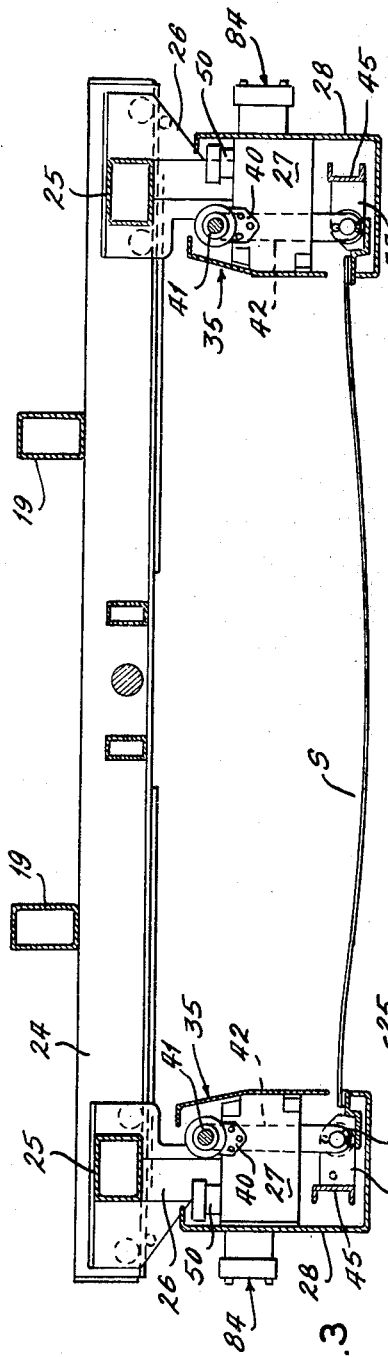
Figure 8:
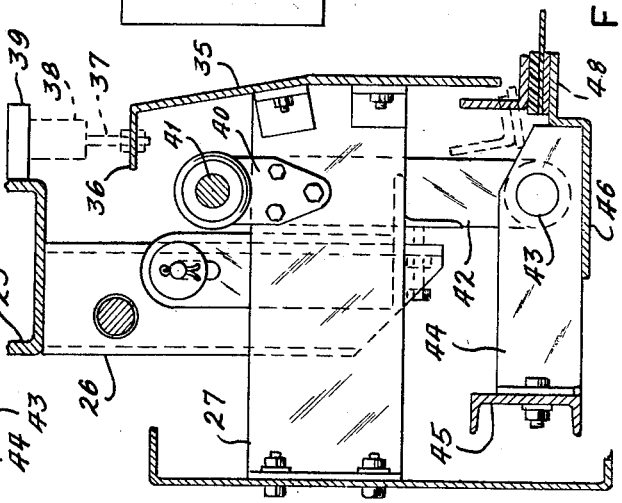
Figure 4:
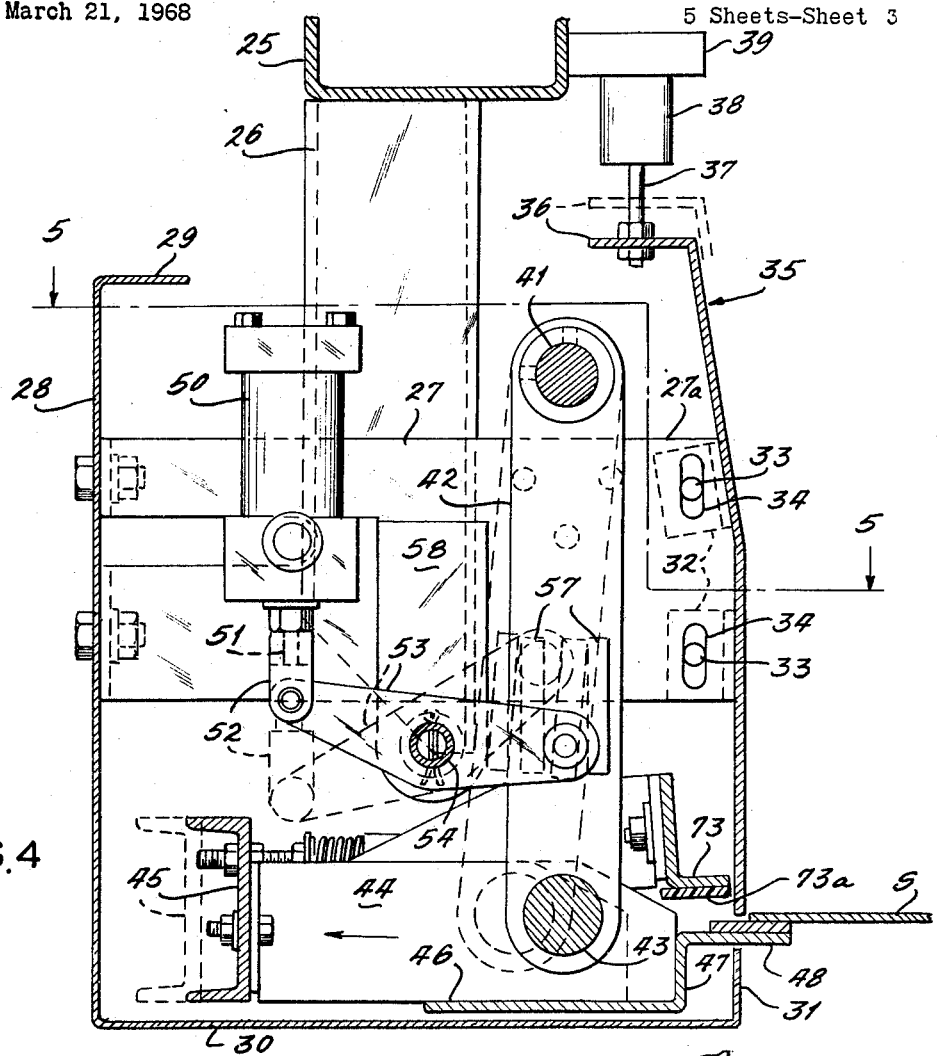
Figure 5:
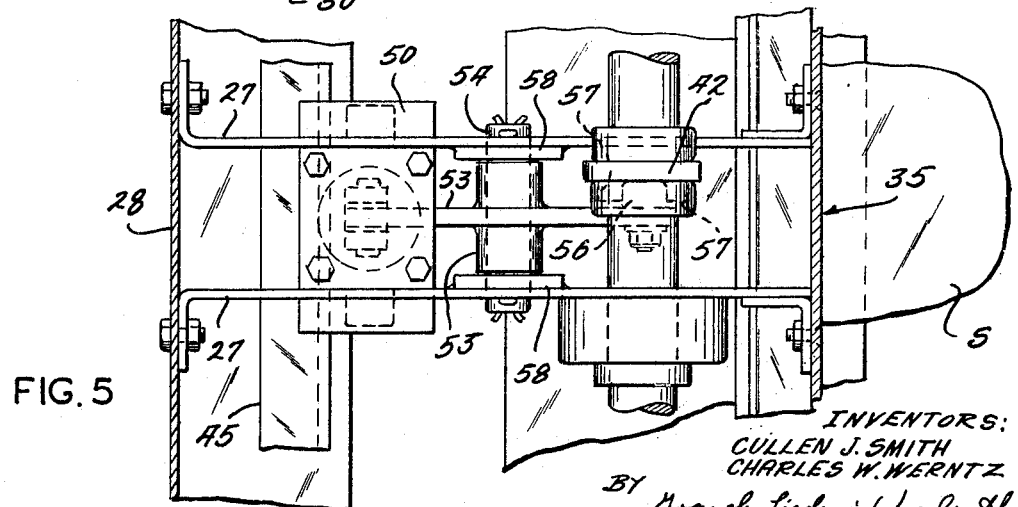
Figure 9:
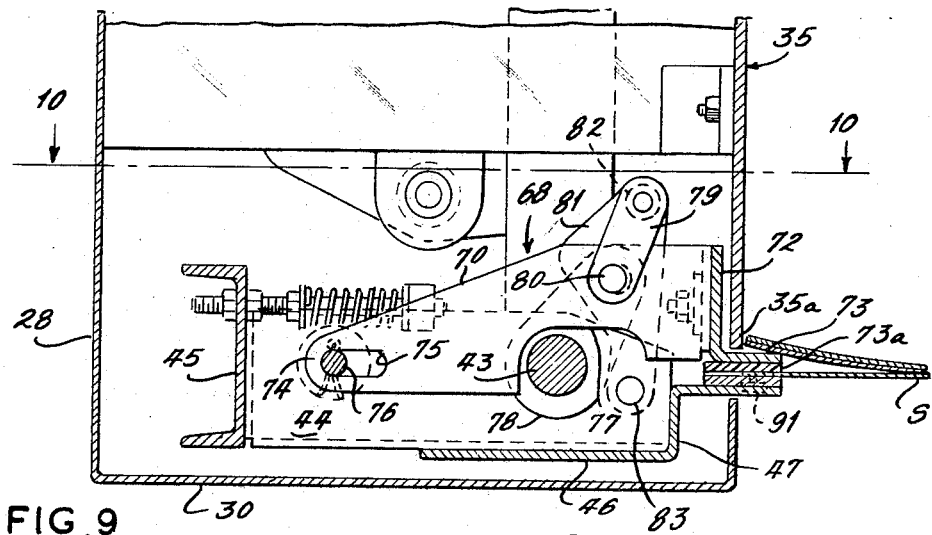
Figure 10:
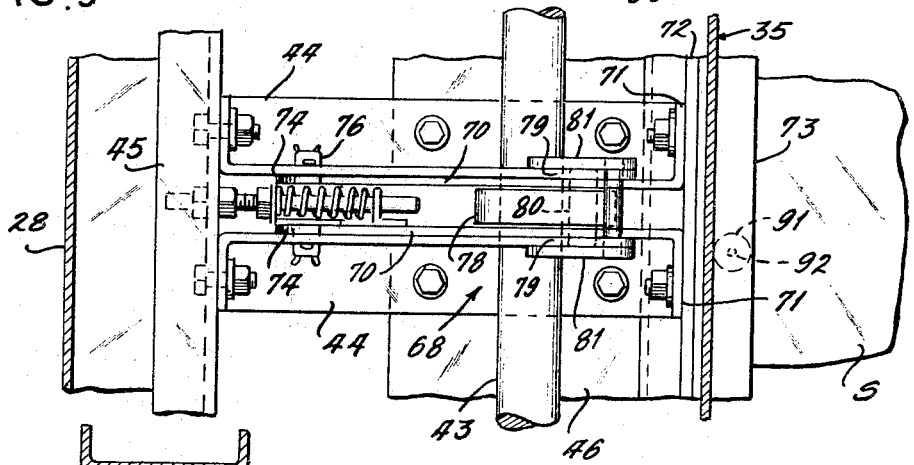
Figure 7:
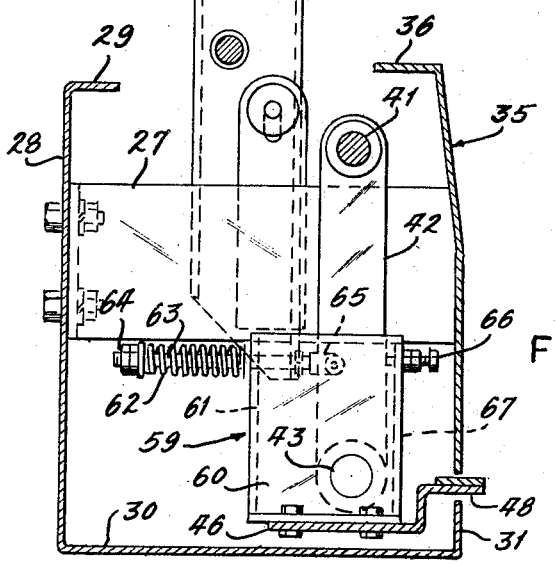
Figure 11:
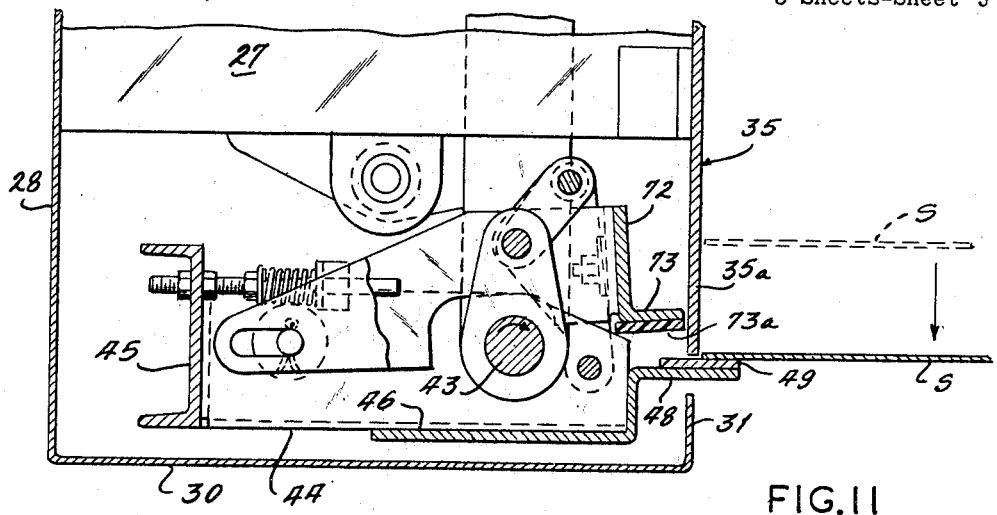
Figure 12:
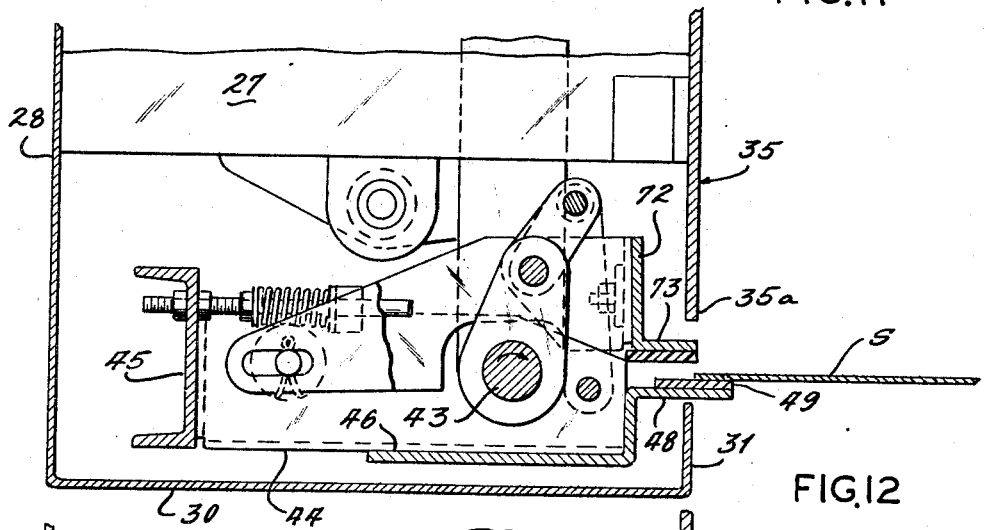
Figure 13:
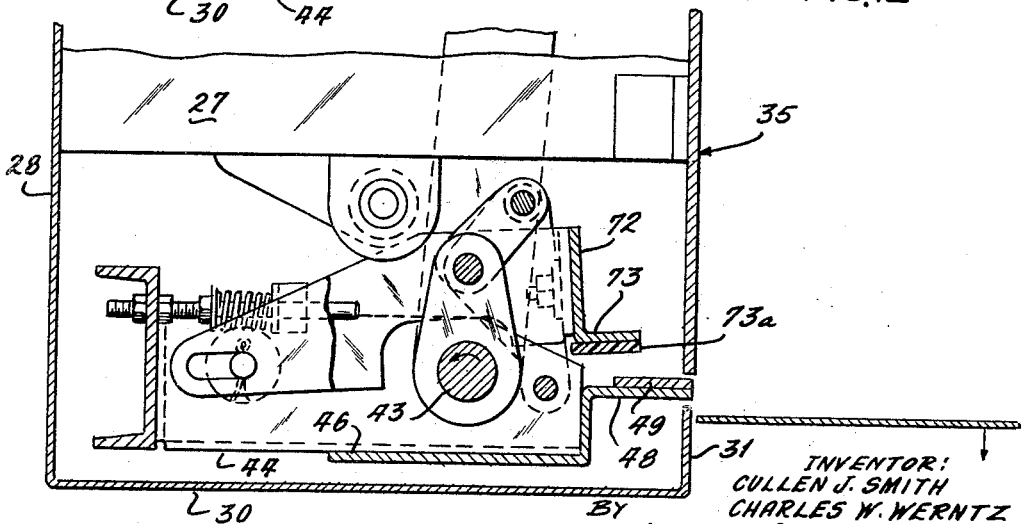

In the drawings:
FIG. 1 is a side elevational view of sheet stacker apparatus which embodies the present invention;
FIG. 2 is a fragmentary plan view on an enlarged scale of a typical portion of the apparatus seen at line 2—2 in FIG. 1;
FIG. 3 is an enlarged transverse sectional elevational view taken at line 3—3 in FIG. 1;
FIG. 4 is an enlarged sectional view taken at line 4—4 in FIG. 2 showing a typical organization of certain of the components of the assembly;
FIG. 5 is a plan view taken at line 5—5 in FIG. 4.
FIG. 6 is an enlarged sectional view showing other typical operating components, the view being taken at line 6—6 in FIG. 2;
FIG. 7 is another enlarged sectional view showing other typical components taken at line 7—7 in FIG. 2;
FIG. 8 is a further enlarged sectional view taken at line 8—8 in FIG. 2;
FIG. 9 is still another enlarged sectional view of typical operating components taken at line 9—9 in FIG. 2;
FIG. 10 is a plan view taken at line 10—10 in FIG. 9;
FIG. 11 is a view similar to FIG. 9, but showing the initial supporting position of the mechanism while a sheet is falling into position;
FIG. 12 is a view similar to FIG. 11 but showing the gripping means in partly extended position; and
FIG. 13 is a similar view to FIG. 11 showing the gripping means in fully retracted position and the side guide in lowered position to guide the released sheet.

In FIG. 1 the apparatus 14 includes a horizontally elongated frame 15 on which sheet feed belt means 16 is operatively mounted to move the sheets to be stacked in a direction rightwardly to the delivery end which is carried in a vertical frame structure 17. The frame 17 is stabilized by tension members 18 such that a cantilever frame 19 may be projected rightwardly from the vertical frame 17 and supported from the frame 17 by tension means 20. An air blower assembly 21 is carried in the frame 15 to supply air at the nozzle 22 which flows outwardly beneath the sheets S as they are projected from the belt 16 outwardly under the frame 19 into the stacking zone 23.

The following description will refer to the lefthand side guide 35 and the mechanism associated therewith, as seen in FIG. 3. It is, of course, understood that the righthand assembly will be similar and it need not be described in detail.

The frame 19 supports transverse members 24 which, in turn, carry longitudinal side frame members 25 (FIG. 3) from which depend a plurality of arms 26 for the purpose of carrying supports 27 (FIGS. 3, 4 and 8) directed horizontally. The outer ends of the supports 27 are connected to a removable housing having a rear wall 28 with an upper stiffening flange 29 and a lower wall 30 which extends inwardly and terminates in an upturned guide lip 31. The inner ends 27a of the supports 27 (FIG. 4) are connected to angle clips 32 by guide pins 33 engaged in vertical slots 34 formed in the clips. The clips 32 are attached to the back surfaces of the side guides 35. Each side guide 35 is provided with an upper flange 36 to which is attached the outer end of a piston rod 37 of an air cylinder 38. The cylinder 38 is mounted on a suitable bracket 39 affixed to the frame member 25. The air cylinders 38 serve to raise and lower the side guides 35 in a sequence that will presently be pointed out.

The support members 27 carry suitable bearings 40 longitudinally aligned to support a pivot shaft 41 from which are suspended swing links 42. The lower ends of the links 42 support a longitudinal rotary shaft 43. The shaft 43 carries at a plurality of zones along it length pairs of pivot plates 44 (FIG. 4) which extend rearwardly and connect with a longitudinal channel member 45 located within the housing wall 28. Also the pivot plates 44 support the body of a longitudinally extending finger member 46 formed at its leading edge with an upturned flange 47 having a projecting horizontal lip 48. The lip 48 extends the length of the side guides 35 and the upper surface of the lip carries a pad 49 on which the sheet material margin is supported.

The lip 48 is extendable and retractable relative to the position of the lower margin 35a of the side guide 35 (FIGS. 4 and 13). The means for moving the lip 48 includes a pair of motor cylinders 50 (FIGS. 2 and 4) mounted on the adjacent supports 27 such that the depending piston rod 51 may be connected by a suitable clevis 52 to one end of a rocker link 53. The link 53 is pivoted on a pin 54 by a bearing 55 disposed between the pair of supports 27 (FIG. 5). The opposite end of the rocker link 53 carries a cam roller 56 which moves between a pair of cam blocks 57 mounted on the side of the adjacent swing link 42. In the full line position of the rocker link 53 (FIG. 4) the swing link 42 is moved toward the side guide 35 to project the lip 48 inwardly beyond the vertical plane of the side guide 35, and in the broken line position the lip 48 is retracted. The pivot pin 54 for the rocker line 53 is supported in a pair of depending bearing straps 58 attached to the respective supports 27. It is understood that the motor cylinders 50 work together to swing the finger member 46 evenly along its length, and this action also displaces the channel member 45 through the pivot plates 44, as well as the rotary shaft 41.

In FIG. 2 there is shown a plurality of tilt control means 59 to permit the member 46 to pivot relative to the shaft 41 so that the finger 48 may tilt to a position where it follows the thrust or pull in the sheet S (FIG. 3) and aligns with the plane of the bow of the sheet. Each means 59 (FIG. 7) includes a bracket 60 attached to the body of member 46 adjacent a swing link 42. The bracket has a rear flange 61 which is abutted by one end of spring 62. The other end of the spring is attached to the tension rod 63 by nuts 64. The rod 63 is connected by clevis 65 to the adjacent swing link 42, and an adjustment screw 66 is carried by a front flange 67 in position to abut the edge of the adjacent swing link 42. It is observed that the pivot axis of the shaft 43 is located to the right of the center of mass of the member 46 so that such member 46 has the tendency to tilt in a counter clockwise direction. Thus the spring 62 for each tilt control means 59 supports the bracket 60 against such tilt and the respective adjusting screws 66 are moved to keep the member 46 in proper longitudinal alignment and to prevent the sheet supporting finger 48 from rising above the horizontal attitude. As the sheets S (FIG. 9) accumulate on the finger 48, the springs 62 will be relieved of compression and the member will tilt clockwise about the axis of shaft 43 to accommodate the thrust or pull of the sheets (see FIG. 3).

Turning now to FIGS. 9 and 10 there is shown a toggle mechanism 68 of which at least two are employed as indicated in FIG. 2. Each mechanism 68 includes a pair of sliding arms 70 operably mounted within an adjacent pair of pivot plates 44. The inner ends of the arms 70 are flanged at 71 for attachment to the rear flange 72 of a longitudinally extending clamp finger 73, which finger extends under the lower margin 35a of a side guide 35. The finger 73 is provided with a friction grip pad 73a. The outer ends 74 of the sliding arms are formed with elongated slots 75 (FIG. 9) which receive a transverse pin 76 mounted between the pivot plates 44. Each arm 70 has an enlarged recess 77 in its lower edge to provide clearance for the shaft 43 and to allow for longitudinal displacement of the plates 44. The pairs of pivot plates 44 are actuated by a toggle linkage which includes a drive arm 78 fast on shaft 43, a pair of lever arms 79 pinned to the outer end of the drive arm 79 by pin 80, and a pair of pressure links 81 pinned to the outer ends of the lever arms 79 by a pin 82. The lower ends of the pressure links 81 are pinned by pins 83 to the adjacent pivot plate 44.

Actuation of each toggle mechanism 68 is achieved by a pair of piston-cylinder motor means 84, and reference will be had to FIGS. 2 and 6 for a showing thereof. In FIG. 6, one such motor means 84 has its piston rod 85 connected by a clevis 86 to the outer end of a power arm 87 by a pin 88. The power arm 87 is connected to the shaft 43 to rotate the latter in response to the delivery of motive fluid (pressure air for example) to the motor means 84. The motor means is carried by trunnion means 89 at its forward end in a pair of spaced mounting plates 90 which are connected to the longitudinal channel member 45 and to the member 46. This assembly allows freedom of tilting action of the member 46, as pointed out above, and the motor means 84 may swing to match the arc of motion of the power arm 87.

As is seen in FIGS. 9 and 10, the projecting support finger 48 and its pad 49 are provided with sensor means 91 (a plurality of such means are spaced along the length of the fingers 48 at each side guide) which may comprise an electrical switch body having its contact actuator 92 extending upwardly through the pad 49 to be engaged by the margin of a sheet S. When the full length of a sheet has settled down on the fingers all sensor means 91 will be closed, thereby completing a control circuit (not believed necessary to show) for energizing the several clamp actuating motor means 84 (FIG. 6) which move the toggle mechanisms 68 to advance the clamp fingers 73 into engagement with the sheet S at its longitudinal edges. The control circuit and necessary components may be of any desired known character and to show and describe the same would unduly extend this specification.

The operation of the present apparatus is as follows: In FIG. 1 it can be seen that a stack of sheets S have accumulated on the pallet or skid P and the height of the stack has reached its maximum for ease of handling. During this phase of the stacking operation the frame assembly 19, together with the feed belt 16, has progressively been elevated by suitable means (not necessary to show) actuated by motor M. This action is intended to keep the bottom edges 31 of the side guide housings adjacent the top most sheet S for purposes of forming the side guides 35 and the top sheet S into an air box so the next sheet S projected into the stacking zone 23 will have a cushion of air on which it floats into position as determined by the stop means 95 (FIG. 1). The support fingers 48 and clamp fingers 73 are, during this phase, maintained in retracted positions of FIG. 13.

Having determined to remove the stack of sheets S as in FIG. 1, it is not necessary to stop the feed conveyor 16. The motor means 50 instead are energized from the retract position in broken outline in FIG. 4 to the full line position such that the swing links 42 are displaced rightwardly to bodily move the body member 46 so as to extend the finger 48 outwardly into the stacking zone 23 to receive the margin of the next sheet S (FIG. 11) as it descends along the side guide 35. At this time the side guide bottom edge 35a has been lowered to close the gap where the clamp finger 73 is located so the sheet cannot float laterally into such gap. Clamp finger 73 is of course held retracted as shown in broken outline in FIG. 6 by the motor means 84, and in this retracted position the toggle mechanism 68 will assume the position shown in FIG. 11.

Once the trailing portion of the sheet S has reached a settled position on the fingers 48 it will close the respective sensors 91 to energize motor means 84 which will then actuate the toggle mechanism 68 progressively through the positions shown in FIG. 12 and 9 respectively. The action is derived by the motion of the power arms 87 (FIG. 6) from the broken line position to the full line position. Thus the clamp finger 73 will, after raising the side guide 35, project outwardly and firmly grip the margin of the sheet S between the pad 73a and the support pad 49 (FIGS. 6, 8 and 9).

Following the gripping of the margin of sheet S the side guide 35 is lowered to the top of clamp finger 73 (FIG. 9) and following sheets S will come to rest on the bottom sheet S which now forms the bottom of the stacking zone 23. The full skid or pallet P can now be removed and an empty pallet placed in position to receive the accumulation of sheets held by the clamp finger 73. The clamp mechanism can be retracted in the sequence of motions shown progressively in FIGS. 12, 11 and 13, following raising of the side guide 35. When the sheets are released the side guide is lowered to position its lower edge 35a over the gap in front of the clamp finger 73. It can be seen that the descending sheets S will be guided laterally by the guide lip or flange 31 on the inner side of the housing bottom wall 30.

From the foregoing description of the presently preferred embodiment of the present invention, it is observed that the normal stacking function of the apparatus 14 is not changed or altered in any manner. On the contrary, the stacking apparatus 14 is greatly improved in that it is made more versatile by being capable of operating on a continuous basis in view of the clamping means now operably associated with the side guides. It is possible now to continuously feed sheets into the stacking zone 23 so that a greater capacity is obtained in a single station layout. It is also to be noted that the sheet gripping means, as indicated in FIG. 3, is organized to yield so that the line of thrust of the sheet S is maintained through the axis of shaft 43 and the support surface of lip 48 is in this plane. Thus, there is no bending or damage caused due to the normal sag or bowing of the sheet S because of its being suspended from the marginal portions over an open space. Part of the sag or bowing is, of course, attributable to the weight of other sheets stacked on top of the bottom sheet as is indicated in FIG. 9.

The sensor means 91 (FIGS. 2 and 9) are normally located at positions where the trailing end of the sheet comes to rest, and a plurality of sensors 91 is preferred so there will be no premature triggering of the marginal gripping means, which act could cause damage to sheet material. Since some sheet material of light gauge will have a slight ripple or flutter, it is preferred to use in each side at least two sensors 91 electrically connected in series so that it requires both sensors to be actuated before the gripping means is actuated. Furthermore, sensor means 91 will be located adjacent each of the side guides and carried by the respective supporting fingers 48.

A feature of the assembly is illustrated in FIGS. 11, 12 and 13 and includes the provision of a guide lip 31 below the position of the supporting finger 48 so that the sheet material as it drops away from the finger 48 will not have a tendency to move laterally. Furthermore, the side guide 35 is slideably mounted on the members 27 so that its lower margin or edge 35a can be brought down close to the finger 48 when the gripping finger 73 is retracted (FIG. 11) and can be raised when it is desired to project the gripping finger 73 into the stacking zone 23 (FIGS. 9 and 12). The side guide bottom margin 35a cooperates with the housing lip 31 to form a side wall to prevent lateral misalignment of the sheet S as it drops down between the side guides in the stacking zone 23. What has been described for one side guide applies equally to both side guides.

It should now be apparent to those skilled in the art how the present apparatus is constructed and in what manner it is intended to operate.

What is claimed is:

1. In apparatus for continuously stacking sheet material in a single stacking station, the improvement which includes: sheet feeding means operable to project individual sheets into the stacking station; means to supply a cushion of air under each sheet projected into the stacking station; side guide means operable in the stacking station to laterally align the margins of the successive sheet material; and sheet supporting means operably carried by said side guide means in position to project from said guide means into the marginal portions of the stacking station and grip at least one sheet at its margins, said support means being retractible behind said side guide means to release the grip on the sheet material.

2. The improvement set forth in claim 1 and including a sheet guide element spaced from said side guide and continuing the guiding of sheets released from said sheet supporting means.

3. The improvement set forth in claim 1 in which said sheet supporting means includes a support finger, a clamping finger, and mechanism operably connected to said fingers to selectively operate said fingers to support and clamp sheets on the support finger and to unclamp and retract the support fingers to release the sheets.

4. The improvement set forth in claim 3 wherein said operating mechanism is connected to said support finger to move it simultaneously with said clamp finger and is connected to said clamp finger to move it relative to said support finger.

5. The improvement set forth in claim 1 wherein said sheet supporting means and side guide means are operably mounted on support means, said sheet support means being pivoted on said support means to accommodate the thrust of the sheet material.

6. A sheet stacking side guide and gripping means including: a side guide having a sheet guiding surface and a defined terminal edge; means supporting said side guide; a first member having a sheet supporting surface thereon and operably mounted on said support means in position to move relative to said guide terminal edge and have said supporting surface project outwardly relative to said sheet guiding surface to be engaged by the margin of a sheet; and a second member having a clamp surface and operably mounted on said support means in position to move relative to said first member to selectively engage and disengage the sheet margin disposed on said sheet supporting surface of said first member.

7. The side guide and gripping means of claim 6 whereing operating mechanism is connected to said first and second members to effect independent and concurrent operating movement.

8. The subject matter set forth in claim 7 wherein said operating mechanism includes separate motor means for said first and second members, and said operating mechanism for said second member including toggle linkage operable to exert pressure through said clamp surface on the sheet margin engaged thereby.

9. The subject matter of claim 7 wherein means is connected to said side guide to move the same relative to said first and second members.

10. The subject matter set forth in claim 6 wherein said first means is operably mounted on said support means to move along a predetermined path which intersects the plane of said sheet guiding surface, and said second means is operably mounted on said support means to move with said first means and to have lost motion relative to said first means.

References Cited

UNITED STATES PATENTS 2,089,890  8/1937  Graf _____ 271—88
2,849,236  8/1958  Beaulieu _____ 271—88
3,334,895  8/1967  Daniels _____ 271—88 X M. HENSON WOOD, JR., Primary Examier R. A. SCHACHER, Assistant Examiner U.S. Cl. X.R.

214—6